(12) United States Patent
Kraus et al.

(10) Patent No.: US 7,156,406 B2
(45) Date of Patent: Jan. 2, 2007

(54) ANTI-ROLL BAR FOR THE CHASSIS OF A MOTOR VEHICLE

(75) Inventors: Manfred Kraus, Herzogenaurach (DE); Jurgen Osterlanger, Emskirchen (DE); Harald Hochmuth, Hagenbuchach (DE); Thomas Dirnberger, Obermichelbach (DE); Wolfgang Reik, Buhl (DE); Thomas Pfund, Leiberstung (DE)

(73) Assignees: INA- Schaeffler KG, Herzogenaurach (DE); LUK Lamellen und Kupplungsbau Beteiligungs KG, Buhl (DE)

( * ) Notice: Subject to any disclaimer, the term of this patent is extended or adjusted under 35 U.S.C. 154(b) by 38 days.

(21) Appl. No.: 11/112,213

(22) Filed: Apr. 22, 2005

(65) Prior Publication Data

US 2005/0204835 A1    Sep. 22, 2005

Related U.S. Application Data

(63) Continuation of application No. PCT/EP03/011718, filed on Oct. 23, 2003.

(30) Foreign Application Priority Data

Oct. 25, 2002    (DE) ................................ 102 50 058

(51) Int. Cl.
*B60G 21/00* (2006.01)

(52) U.S. Cl. .......................... 280/124.107; 280/124.106
(58) Field of Classification Search ............. 280/5.501, 280/5.502, 5.506, 5.511, 6.15, 6.153, 6.157, 280/124.106, 124.107; 74/55, 56, 99 R
See application file for complete search history.

(56) References Cited

U.S. PATENT DOCUMENTS

| | | | | |
|---|---|---|---|---|
| 5,573,265 A * | 11/1996 | Pradel et al. | .......... | 280/124.107 |
| 6,318,737 B1* | 11/2001 | Marechal et al. | ......... | 280/5.511 |
| 6,860,167 B1* | 3/2005 | Schmidt et al. | ................ | 74/56 |
| 2003/0015048 A1* | 1/2003 | Schmidt et al. | ............. | 74/99 R |
| 2004/0262858 A1* | 12/2004 | Ersoy | ....................... | 280/5.511 |
| 2005/0110228 A1* | 5/2005 | Fujimori | ................... | 280/5.511 |

* cited by examiner

*Primary Examiner*—Paul N. Dickson
*Assistant Examiner*—Barry Gooden, Jr.
(74) *Attorney, Agent, or Firm*—Volpe and Koenig, P.C.

(57) ABSTRACT

The invention relates to a roll stabilizer for the chassis of a motor vehicle, comprising an actuator (3), which is mounted between anti-roll bar halves (1, 2) and which rotates these about a rotation axis in opposite directions as necessary. The curved path carriers (4, 5) of the actuator that are assigned to the roll stabilizer halves (1, 2) are each provided with a curved path (17, 18) inside of which a coupling element (13) is guided that can be displaced along these curved paths (17, 18) via an actuating drive (7, 10). The U-shaped or V-shaped curved path (18) of one curved path carrier (5) has two curved path branches (19, 20) that are arranged in a mirror symmetric manner in relation to a longitudinal central plane containing the rotation axis of the actuator (3).

9 Claims, 2 Drawing Sheets

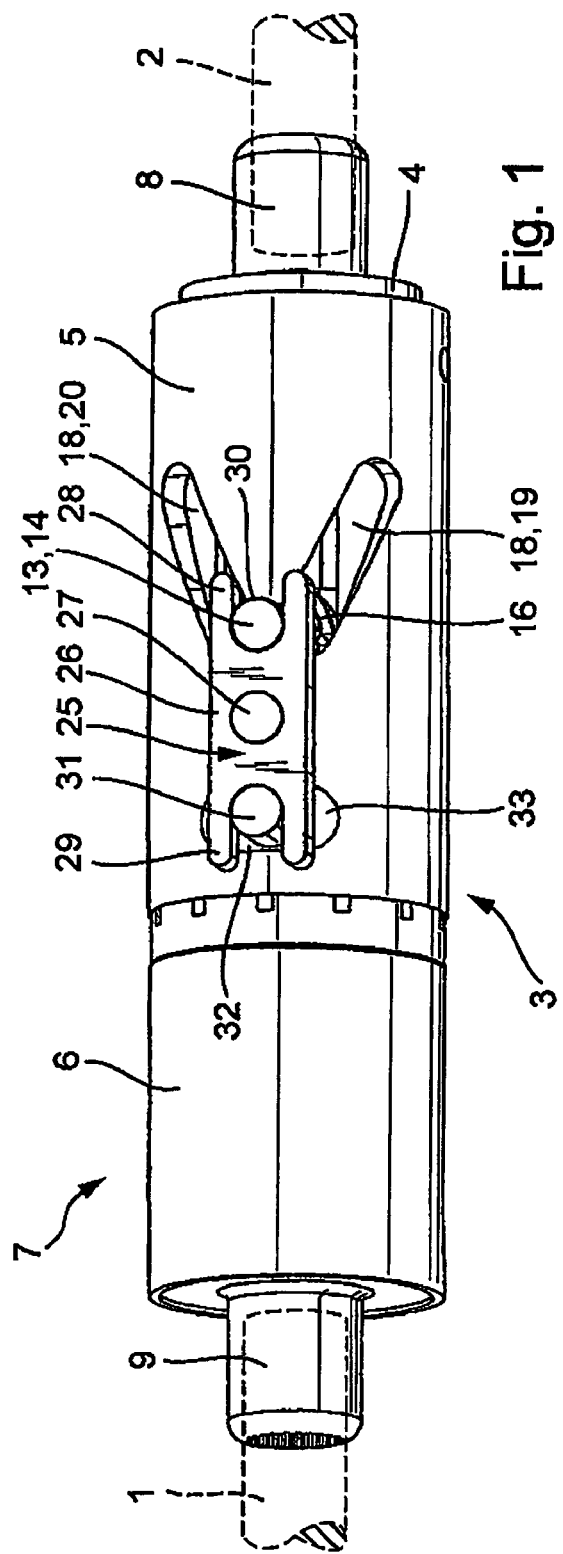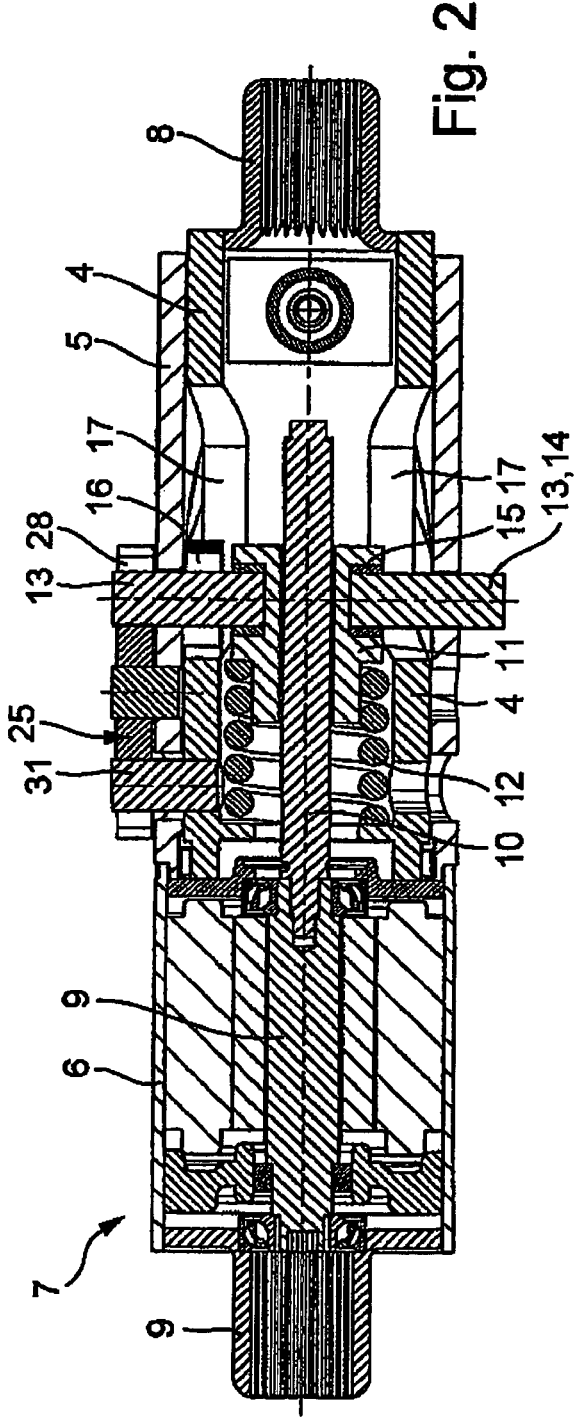

ANTI-ROLL BAR FOR THE CHASSIS OF A MOTOR VEHICLE

CROSS-REFERENCE TO RELATED APPLICATIONS

This application is a continuation of PCT/EP2003/011718, filed Oct. 23, 2003, which is incorporated herein by reference as if fully set forth.

FIELD OF THE INVENTION

The following invention relates to a roll stabilizer for the chassis of a motor vehicle. The object of these stabilizers is to reduce the tendency of the body to roll when driving through turns and to influence the behavior when driving through turns, i.e. to improve driving safety. As a rule, the stabilizer remains without any effect during equilateral suspension.

BACKGROUND

For example, from DE 100 02 455 A1 a stabilizer arrangement for the chassis of a motor vehicle has been known, in which an actuator is arranged between stabilizer halves, rotating the two stabilizer halves in reference to one another around a rotational axis, if necessary. Here, the rotation of the two stabilizer halves in reference to one another is to counteract the roll of the body. The actuator is provided with curved path carriers having one curved path each, in which a coupling element, that can be displaced, is guided along said curved paths by means of an actuating drive. For example, a ball screw can be provided as an actuating drive having a spindle nut arranged on its threaded spindle carrying the coupling element. The coupling element comprises pins, arranged laterally in reference to the rotational axis of the actuator, with support rolls being pivotally supported on them. These support rolls engage the curved paths of the two curved path carriers. With the rotation of the threaded spindle, the spindle nut shifts along the rotational axis of the actuator, with the support rolls rolling along the curved paths. During this adjustment motion, a relative rotation of the two curved path carriers occurs in reference to one another due to the design of the curved paths. This relative rotation creates a torque in the opposite direction of the undesired roll. One of the curved paths is embodied approximately S-shaped, with one end of the S-shaped curved path facing one axial end of the actuator and the other end of the S-shaped curved path facing the other axial end of the actuator. Seen in the longitudinal direction of the actuator, a neutral position or starting position of the actuator is located approximately in the middle of the S-shaped curved path. The displacement of the coupling element out of this starting position occurs, depending on the rolling direction, towards one axial end of the S-shaped curved path or towards the other one. In order to allow the construction space of the actuator to be reduced in the axial direction, the two curved path carriers may be arranged coaxially nested. It would be desirable to provide an anti-roll bar in which the axial construction space required is further reduced.

SUMMARY

According to the invention, this objective is attained in that the U-shaped or V-shaped curved path of one of the curved path carriers is provided with two curved path branches, arranged approximately U-shaped or V-shaped in reference to one another, arranged with a mirror-reflection symmetrically in reference to a longitudinal central plane containing the rotational axis of the actuator. Depending on the rolling direction, the coupling element is either guided and displaced into one of the curved path branches or into the other curved path branch. With this V-shaped arrangement, the axial extension of the curved path can be cut in half in reference to previously known solutions.

The two curved path branches preferably merge in an interface contained in the longitudinal central plane. Starting from the interface, the coupling element can be directed into one curved path section or into the other curved path section, as needed.

Preferably, a neutral position of the actuator is provided in the interface. When, for example, a tube section is used for the curved path carrier, the U-shaped or V-shaped curved path can be formed in this tube section without any problems. In order to perfectly keep the coupling element in its neutral position, a stop position may be embodied in the interface of the two curved path branches. For example, if the tube section is used for the curved path carrier the interior wall of the curved path may be provided with a plateau arranged in the area of the interface laterally to the rotational axis of the actuator. In its original position, the coupling element rests on the plateau. For example, when the roll, caused by driving through turns, must be counteracted, the coupling element can be adjusted by means of a control element off the plateau, optionally into one curved path branch or into the other curved path branch. There, the coupling element is always displaced in an axial direction, with the rotational direction of the relative rotation of the two stabilizer halves occurring either clock-wise or counter clock-wise, depending on the selected curved path branch.

A rolling impulse is preferably used for controlling the coupling element, directing the coupling element into the one curved path branch, wherefrom a torque can counteract the tendency to roll.

Preferably, the control comprises a tilting bar, with its tilting axis being arranged laterally in reference to the rotational axis of the actuator. One end of the tilting bar preferably engages the coupling element and the other end of the tilting bar preferably engages the other curved path carrier. For example, if, as the result of driving through turns, a torque effective between the stabilizer halves is directed in a counter clock-wise rotational direction, the end of the tilting roll engaging the other curved path carrier is also tilted counter clock-wise. Now, the tilting bar pivots around its rotational axis, with the other end of the tilting bar being displaced in a clock-wise direction. With this displacement in the clock-wise direction, the coupling element is now also displaced in the clock-wise direction off the plateau into the appropriate curved path section. Now, activating the actuating drive, an axial displacement of the coupling element into the curved paths can occur, and the tendency to roll can be effectively counteracted by a torque.

The curved path of the other curved path carrier is embodied parallel to the rotational axis of the actuator. Such parallel arrangements can be produced particularly cost-effective and in a simple manner.

BRIEF DESCRIPTION OF THE DRAWINGS

In the following, the invention is explained in greater detail using the exemplary embodiment shown in the three figures. Shown are:

FIG. 1 is a perspective view of a roll stabilizer according to the invention,

FIG. 2 is a longitudinal section view of a roll stabilizer according to the invention.

DETAILED DESCRIPTION OF THE PREFERRED EMBODIMENTS

Figure 3:
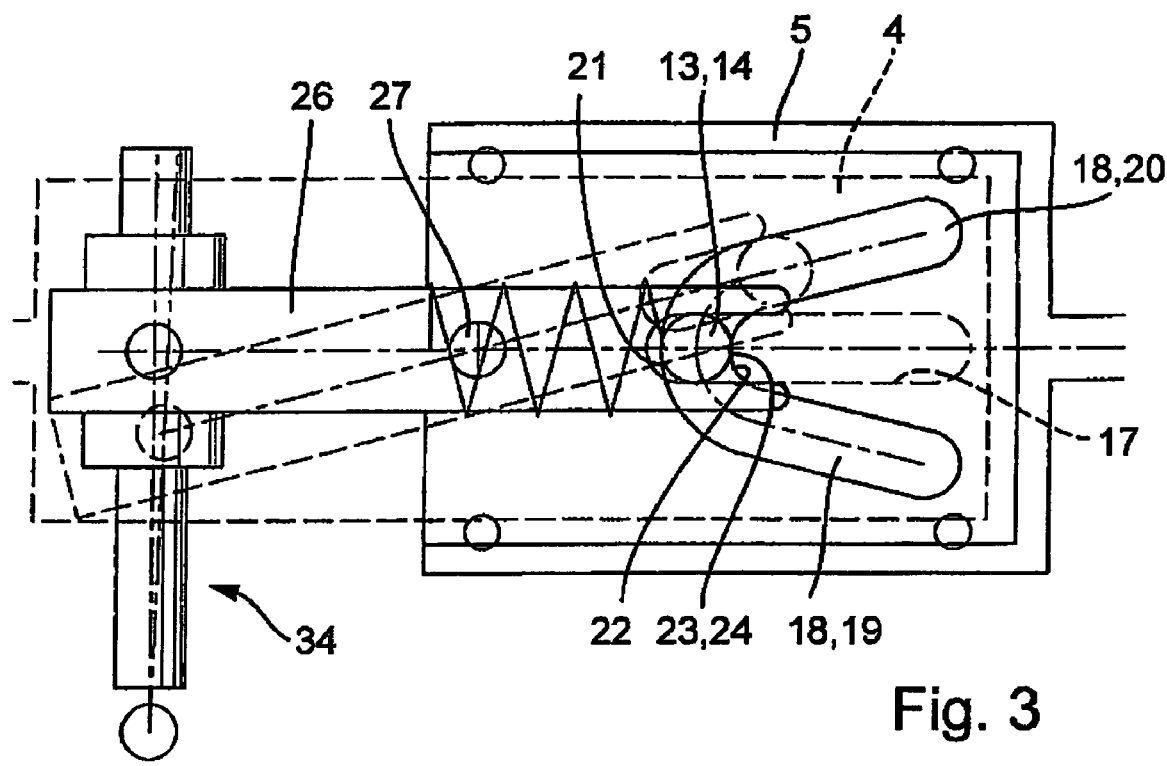
FIG. 3 is a schematic representation of the operating mode of the roll stabilizer according to the invention, having a modified control.

The roll stabilizer according to the invention for the chassis of a motor vehicle, shown in FIGS. 1 through 3, comprises stabilizer halves 1, 2, only shown in dashed lines, here. Between the stabilizer halves 1, 2 an actuator 3 is provided, which in itself represents a primary feature of the invention. The actuator 3 rotates, if necessary, the two stabilizer halves 1, 2 in reference to one another around the rotational axis of the actuator 3.

The actuator 3 is provided with two coaxially nested curved path carriers 4, 5. The two curved path carriers 4, 5 are embodied in a tube-shaped manner and are rotatable in relation to one another. The exterior curved path carrier 5 is mounted with its left end, as shown in FIG. 2, to a housing 6 of the electric motor 7. At their face ends, facing in opposite directions, the curved path carrier 4 and the housing 6 are each provided with a pin catch 8, 9 for the torque proof acceptance of the ends of the stabilizer halves 1, 2.

A threaded spindle 10 is mounted to a rotor 9 of the electric motor 7. The threaded spindle 10 is arranged coaxially in reference to the two curved path carriers 4, 5. A threaded nut 11 of the type of a ball screw, known per se, is rotatably arranged on the threaded spindle 10. A relative rotation of the threaded spindle 10 to the spindle nut 11 is converted into an axial motion of the spindle nut 11 in reference to the curved path carriers 4, 5. This arrangement forms an electro-mechanical actuating drive 11a.

A helical pressure spring 12 is coaxially arranged on the threaded spindle 10, on the one hand, supported on the curved path carrier 4 and, on the other hand, cushioned on the spindle nut 11. The spindle nut 11 carries a coupling element 13, which is required for a rotation of the two curved path carriers 4, 5 in reference to one another, as explained in the following. The coupling element 13 comprises several adjustment pins 14, distributed over the circumference of the spindle nut 11, which are arranged in a star-shaped fashion around the rotational axis of the actuator 3. The adjustment pins 14 are accepted in radial bearings 15 at the spindle nut 11, rotatable around their longitudinal axis. Support rolls 16 are pivotally supported on the adjustment pins 14.

At several places, the curved path carrier 4 is provided with straight curved paths 17, distributed over the circumference and arranged parallel to the rotational axis of the actuator 3. At several places each, distributed over its circumference, the curved path carrier 5 is provided with a V-shaped curved path 18, its curved path branches 19, 20 being arranged approximately V-shaped in relation to one another and in a mirror reflection symmetrical arrangement to a longitudinal central plane containing the rotational axis of the actuator 3. The V-shaped curved path 18 and/or its curved path branches 19, 20 are clearly discernible from FIGS. 1 and 3. The coupling elements 13 couple the two curved path carriers 4, 5, to one another. For this purpose, the adjustment pins 14 each engage both the curved path 17 as well as the V-shaped curved path 18. The support rolls 16 cooperate with the curved path 17, while the adjustment pins 14, using their circumference, each cooperate with the V-shaped curved path 18. The two curved path branches 19, 20 of each V-shaped curved path 18 cross in an interface 21 contained in the longitudinal central plane, as indicated in FIG. 3. In a neutral position of the actuator 3, the coupling element 14, i.e. here the adjustment pin 14, is located in the interface 21. In the present example, a stop position 23 is provided at the interior wall 22 of the V-shaped curved path 18 for a perfect positioning of the adjustment pin 14, as discernible from FIG. 3. This stop position 23 for the coupling element 13, i.e., here, the adjustment pin 14, is positioned laterally to the rotational axis of the actuator 3 and forms a plateau 24. The curved paths 17, 18 combined with the coupling element 13, forms a curved path transmission 23a.

In the present invention, the electro-mechanical actuating drive 11a is provided, comprising the above-described electric motor 7 with the connected ball screw. When the roll of the vehicle body is to be counteracted, the two stabilizer halves are rotated opposite the effective rolling moment in active anti-roll bars. Here, this rotation is achieved such that, due to the activation of the electric motor 7, the spindle nut 11 is axially displaced, with the adjustment pins 14, each arranged in one of the two curved path branches 19, 20, being displaced along said curved path branches 19, 20. This means that the exterior curved path carrier 5 is rotated in reference to the adjustment pins 14 and in reference to the curved path carrier 4. When the adjustment pin 14 is located in the curved path branch 19, the relative rotation occurs counter clock-wise. When the adjustment pin 14 is located in the curved path branch 20, the relative rotation occurs clock-wise.

Depending on the orientation of the effective rolling moment, it must be selected into which of the two curved path branches 19, 20 the adjustment pin 14 shall be directed, originating from its neutral position in the interface 21. For this purpose, according to FIGS. 1 and 2, a control 25 is provided, by which the coupling element 13 can optionally be directed out of the neutral position into one of the two curved path branches 19, 20. This control 25 comprises a tilting bar 26, pivoting around a tilt axis 27. The tilt axis 27 is arranged laterally to the rotational axis of the actuator 3. One end 28 of the tilting bar engages the coupling element 13 and the other end 29 of the tilting bar engages the other curved path carrier 4. In the present exemplary embodiment, the adjustment pin 14 engages a U-shaped catch 30 of the tilting bar 26 at its end 28 of the tilting bar. At the other end 29 of the tilting bar, pins 31 each engage a U-shaped catch 32 at the other end 29 of the tilting bar. The tilt axis 27 is mounted to the curved path carrier 5.

This control 25 can advantageously use the rolling moment in order to direct the coupling element 13 into the respective curved path branch 19, 20 of the V-shaped curved path. If, for example, a relative rotation of the two stabilizer halves 1, 2 in reference to one another in the clock-wise direction is initiated by the rolling moment, the pin 31 also tilts in the clock-wise direction and moves in the circumferential direction in reference to the curved path carrier 5. This relative rotation in reference to the curved path carrier 5 is possible because grooves 33 are provided in the curved path carrier 5 in the circumferential direction, penetrated by the pin 31. Now, the tilting bar 26 also tilts with its end 29 of the tilting bar in the clock-wise direction and/or upwards, considering FIG. 1. Now, the tilting bar 26 tilts with its end 28 of the tilting bar counter-clock wise, i.e. downwards in FIG. 1. By this tilting motion of the end 28 of the tilting bar the adjustment pin 14 is displaced out of its stop position 23 and into the curved path section 19. Now, the helical spring 12 presses the spindle nut 11 axially to the right. This motion is supported by the activation of the electric motor 7 driving the threaded spindle 10. The farther the coupling element 13 is displaced to the right, the greater the rotation of the two curved path carriers 4, 5, in reference to one another so that the rolling moment is actively being counteracted.

The helical spring 12 supports the electric motor 7. In the starting phase of the electric motor 7, the pre-stressed helical spring 12 supports the desired adjustment process with the full force of its pressure. Via any suitable control, the motor 7 can now be controlled such that, after the rolling moment has ceased, the coupling element 13 can return to its neutral position, with the helical spring 12 then regaining its full pre-stressed force.

FIG. 3 shows, in a schematic representation, an alternative control 34, in which the tilting bar 26 is operated via an electrically driven actuating motor 35. Similar to the above-described control, the directing of the tilting bar 26 into one of the two rotational direction is dependent on the determined rolling moment.

LIST OF REFERENCE CHARACTERS

1 Stabilizer half
2 Stabilizer half
3 Actuator
4 Curved path carrier
5 Curved path carrier
6 Housing
7 Electric motor
8 Pin catch
9 Pin catch
9a Rotor
10 Threaded spindle
11 Spindle nut
11a Actuating drive
12 Helical spring
13 Coupling element
14 Adjustment pin
15 Radial bearing
16 Support roll
17 Curved path
18 V-shaped curved path
19 Curved path branch
20 Curved path branch
21 Interface
22 Interior wall
23 Stop position
23a Curved path transmission
24 Plateau
25 Control
26 Tilting bar
27 Tilt axis
28 End of tilting bar
29 End of tilting bar
30 Catch
31 Pin
32 Catch
33 Groove
34 Control
35 Adjustment motor

The invention claimed is:

1. A roll stabilizer for a chassis of a motor vehicle, comprising:
   an actuator (3) arranged between stabilizer halves (1,2) that rotates them opposite to one another around a rotational axis counteracting roll;
   the stabilizer halves include path carriers (4,5), each being provided with a path (17,18);
   a coupling element (13) is guided in each of the paths and is displaceable along the paths (17,18) via an actuating drive (7,10);
   the path (18) of one of the path carriers (5) is curved;
   the curved path (18) is provided with two curved paths branches (19,20) arranged in a mirror reflection symmetrical in reference to a longitudinal central plane containing the rotational axis of the actuator (3);
   the curved path (18) is approximately a V-shaped or U-shaped curved path.

2. A roll stabilizer for a chassis of a motor vehicle according to claim 1, wherein the curved path branches (19, 20) merge at an interface (21) located in the longitudinal central plane.

3. A roll stabilizer for a chassis of a motor vehicle according to claim 2, wherein in a neutral position, the coupling element (13) is located in the interface (21) of the two curved path branches (19, 20).

4. A roll stabilizer for a chassis of a motor vehicle according to claim 3, wherein a control (25) is provided by which the coupling element (13) can optionally be directed out of the neutral position into one of the two curved path branches (19, 20).

5. A roll stabilizer for a chassis of a motor vehicle according to claim 4, wherein the control is provided with a tilting bar (26), having a tilt axis arranged perpendicular to the rotational axis of the actuator (3).

6. A roll stabilizer for a chassis of a motor vehicle according to claim 5, wherein one end (28) of the tilting bar engages the coupling element (13) and an other end (29) of the tilting bar engages the other path carrier (4).

7. A roll stabilizer for a chassis of a motor vehicle according to claim 2, wherein a stop position (23) for the coupling element (13) is provided at the interface (21) of the two curved path branches (19, 20).

8. A roll stabilizer for a chassis of a motor according to claim 7, wherein an interior wall of the curved path (18), in an area of the interface (21), is provided with a plateau (24) which forms the stop position for the coupling element (13) laterally to the rotational axis of the actuator.

9. A roll stabilizer for a chassis of a motor according to claim 1, wherein the path (17) of the other path carrier (4) is generally straight and is provided parallel to the rotational axis of the actuator (3).

* * * * *